United States Patent [19]
Lai

[11] Patent Number: 5,676,987
[45] Date of Patent: Oct. 14, 1997

[54] LOW-FAT MEAT ANALOGUES AND METHODS FOR MAKING SAME

[75] Inventor: Dar-Jen Lai, Glen Ellen, Ill.

[73] Assignee: Swift-Eckrich, Inc., Downers Grove, Ill.

[21] Appl. No.: 481,707

[22] Filed: Jun. 7, 1995

Related U.S. Application Data

[62] Division of Ser. No. 344,279, Nov. 23, 1994, abandoned.

[51] Int. Cl.⁶ .............. A23J 3/14; A23L 1/0522; A23L 1/314; A23L 1/317
[52] U.S. Cl. .............. 426/104; 426/574; 426/578; 426/646; 426/656; 426/802
[58] Field of Search .............. 426/104, 578, 426/656, 802, 573, 641, 646, 574

[56] References Cited

U.S. PATENT DOCUMENTS

| | | | |
|---|---|---|---|
| 5,360,624 | 11/1994 | Okura et al. | 426/573 |
| 5,380,542 | 1/1995 | Jenkins et al. | 426/573 |

OTHER PUBLICATIONS

Hullinger et al, "Food Applications of High Amylose Starches", *Food Technology*, vol. 27 (3):22–24 (1973).

*Primary Examiner*—Arthur L. Corbin
*Attorney, Agent, or Firm*—Pretty, Schroeder & Poplawski

[57] ABSTRACT

Low-fat meat foods with much of the flavor and physical properties of conventional full-fat meat foods are provided. These novel low-fat meat foods comprise meat or plant protein and thermo-irreversible starch gel that mimics the texture of a dispose tissue. Also provided are methods of making low-fat meat foods comprising combining low-fat meat or plant protein with the thermo-irreversible starch gel.

20 Claims, No Drawings

LOW-FAT MEAT ANALOGUES AND METHODS FOR MAKING SAME

This is a division of application Ser. No. 08/344,279, filed Nov. 23, 1994, now abandoned.

BACKGROUND OF THE INVENTION

The present invention relates to novel low-fat food products and methods for making them. In a particular aspect of the present invention, thermo-irreversible starch gel is employed as a fat substitute in low-fat meat foods.

There is an ever-increasing interest among consumers in food products which contain less total fat, saturated fat, cholesterol, and calories. Such products are useful in controlling body weight and reducing the risk of heart disease. Nevertheless, from the consistently high incident of heart disease it is evident that consumers are reluctant to sacrifice good tasting food for better health.

Traditional minced meats for example, such as sausages, salami, and meatballs, are renowned for their flavor, but generally contain from about 25% to about 50% fat and from about 290 to about 520 calories per 100 grams of product. Low-fat minced meat foods and analogues have been developed in an effort to reduce fat content, but have not resulted in a satisfying alternative because they are riddled with an unpalatable mouthfeel and flavor.

For processed meats, such as minced meat foods, the mouthfeel of fat relates not only to the melting and juiciness characteristic of lard or tallow, but also to the underlying adipose or fat tissue texture. Fat tissue texture is non-liquid, smooth, springy, somewhat slippery and chewy at warm temperatures. Numerous attempts have been made to mimic the physical attributes of fat in meat food products. While these attempts have been reported to improve the delivery of juiciness at serving temperatures, they have failed to mimic the unique and appealing texture of fat tissue.

Because of the high fat and calorie content of conventional meat products, there has long been a significant need for low-fat meats that have the flavor and physical properties of conventional full-fat meat products. The compositions and methods of the present invention meet these needs and provide related advantages as well.

BRIEF DESCRIPTION OF THE INVENTION

Low-fat meat foods with much of the flavor and physical properties of conventional full-fat meat foods are provided. These novel low-fat meat foods comprise meat and thermo-irreversible starch gel. Also provided are methods of making low-fat meat foods and low-fat meat analogues which comprise combining meat or, in the case of a meat analogue, plant protein with thermo-irreversible starch gel.

DETAILED DESCRIPTION OF THE INVENTION

The public's insatiable demand for low-fat foods in general has fueled the search for methods of making low-fat meat foods that do not leave the meat bereft of texture and flavor normally associated with full-fat meat foods. Merely eliminating the fat in these types of meat foods results in a dry, firm and crumbly texture and monotonous taste. The present invention provides low-fat meat foods and methods of making low-fat meat foods that retain the flavor and physical characteristics of full-fat meat foods.

Disclosed herein is the discovery that thermo-irreversible starch gels can be effectively used in food, particularly meat foods and meat analogues, to mimic the mouthfeel and flavor of fat tissue. Although the types of foods to which this invention can be applied are without limitation, the present invention is preferably used to produce meat foods and vegetarian meat food analogues, and even more preferably to produce minced meat foods and vegetarian, minced meat food analogous such as for example, sausages, meatballs, frankfurters, bologna, meat loaves, salami, hamburger, soy burgers, ground beef, hash, meat dumplings and the like.

Thus, in accordance with the present invention, there is provided low-fat meat foods comprising meat and one or more thermo-irreversible starch gel. Also provided are low-fat meat food analogues comprising plant protein and thermo-irreversible starch gel. These low-fat foods can be ready-to-serve foods, prepared ready-to-cook foods or raw foods and may include other ingredients commonly found in prepared meat foods such as, for example, vegetables, pastry, breading, gravy, seasonings and the like.

The term "low-fat" as used herein to describe "foods," "meat foods," and "meat-analogue foods" refers to foods having a fat content of about 20% or less of the total weight of the finished food product, and preferably to foods having a fat content of about 10% or less of the total weight of the finished food product, and most preferably foods having a fat content of 5% or less of the total weight of the finished food product.

Meats useful in the practice of the present invention include, for example, any one or combination of the following meats: beef, pork, poultry, mutton, and the like. Preferably, meats useful in the practice of the present invention are low in fat meats.

The term "gelling agent" as used herein refers to any substance that can form an edible gel. A "starch gelling agent" is a gelling agent comprising starch that can form a thermo-irreversible gel. Starch is a polymer having repeated carbohydrate units which occurs in abundance in many plants. Commercially available starches from which starch gelling agents, and in turn thermo-irreversible starch gels useful in the practice of the present invention can be made, include for example, rice starch, wheat starch, corn starch and the like, and preferably includes, for example, tapioca starch and potato starch (Avebe America Inc., Princeton, N.J.). Corn starch is preferably used when a texture similar to soft fat at hot serving temperatures is desired and potato starch or tapioca starch are preferred when a texture close to adipose tissue at cold or hot serving temperatures is desired.

Those of skill in the art will recognize that starches in starch gelling agents can be chemically modified to provide other favorable attributes such as for example, freeze/thaw stability, without loosing its essential ability to form a thermo-irreversible gel. It will also be recognized by those of skill in the art that starch gelling agents need not be (but certainly can be) substantially pure starch and may include protein, fat and/or sugar provided that these substances do not prohibit the formation of a thermo-irreversible gel. Addition of these substances may even be preferred in certain embodiments when a particular opacity, for example, is desired. Thus, for example, rice flour, potato flour and the like can also be used as starch gelling agents.

The terms "thermo-irreversible starch gel" and "pre-gelled starch" as used herein refers to a gel which is formed from a starch gelling agent and which may soften, but does not melt or liquify, upon heating to normal cooking temperatures. Thermo-irreversible starch gel, when included in low-fat meat foods provides, lubricity and body to the food with a characteristically juicy and tender texture commonly associated with meat foods having a normal fat content. In marked contrast, for example, when starch is included in low-fat meat foods by adding it in a non-gelled form, a characteristically unpalatable, monotonous texture that is starchy, dry or watery is generated, as is evident from the results of the comparative study described below in Example III. Without being bound by any particular theory, it is presently believed that meat or non-meat ingredients present in low-fat meat foods, interfere with gelation of starch gelling agents thereby preventing the formation of a starch gel matrix that would otherwise confer the texture of adipose tissue to the food.

Thermo-irreversible starch gels can be made by means well known in the art. For example, it is well known that starch undergoes thermo-irreversible gelation in hot water (in a range of about 140° to about 185° F.), but is insoluble in cold water. Gelation in water at room temperature, however, can be induced by chemical modification of the starch. The extent of gelation should be controlled to provide suitable plasticity for the subsequent processing and the food formulation contemplated. It is presently preferred that the time and temperature of gelation be adjusted to achieve 65%–100% gelation for thermo-irreversible starch gels used in the low-fat meat foods described herein.

One method of forming a thermo-irreversible starch gels is by dispersing a starch gelling agent in water, heating the dispersion to a temperature and for a time sufficient to cause the desired gelation of the starch and then cooling the dispersion to allow a gel to form. Alternatively, the starch gelling agent may be added to hot water, the water/starch mixture allowed to incubate for a sufficient time to allow gelation, followed by cooling to allow desired gelation to form.

One presently preferred method of making thermo-irreversible starch gel from, for example potato starch, is provided below in EXAMPLE I. One of skill in the art will understand that other starch gelling agents may be substituted for potato starch. One of skill in the art will also understand that although the EXAMPLES illustrate use of one thermo-irreversible starch gel, combinations of thermo-irreversible starch gels may be used in the compositions and methods of the present invention.

The amount of thermo-irreversible starch gel included in the low-fat food products of the present invention and the methods of the present invention will depend upon the fat content normally associated with its full-fat counterpart and the desired texture and flavor of the low-fat food product. One of skill in the art can adjust the formulation to optimize texture and flavor to simulate the full-fat counterpart. For example, in a low-fat minced meat food made in accordance with the present invention, the amount of thermo-irreversible starch gel to minced meat contained in the low-fat minced meat food product is in the range of about 5% to about 50% by weight of the minced meat, preferably in the range of about 10% to 40% by weight of the minced meat and is most preferably about 30% by weight of the minced meat.

Once the thermo-irreversible starch gel is formed, it should be shaped or ground to a particle size suitable for use in the food of interest. For example, the thermo-irreversible starch gel can be pre-ground prior to adding to a food, or if the food is amenable to mincing the thermo-irreversible starch gel can be added to the food and the combination minced together. Alternatively, thermo-irreversible starch gel can be molded to a desired shape or particle size during formation of the thermo-irreversible starch gel. In a presently preferred embodiment of the invention, a low-fat minced meat food comprises minced meat and thermo-irreversible starch gel having an average particle size of about 0.1 to about 3 times the particle size of the minced meat.

In another embodiment of the invention there is provided methods of making low-fat, meat foods that comprise combining one or more thermo-irreversible starch gels with meat. Optionally, flavorants, salts, preservatives, vegetables, pastries, breading and the like may be added to this mixture or may be added, when appropriate, to the meat prior to combining the meat with the thermo-irreversible starch gel. The meat can be pre-cooked or raw. If the meat is raw, the pre-gelled starch/meat mixture can then be cooked and packaged, or packaged raw.

In yet another embodiment of the present invention, there is provided meat food products prepared in accordance with the methods of the present invention.

The invention will now be described in greater detail by reference to the following, non-limiting examples.

EXAMPLE I

FORMATION OF A THERMO-IRREVERSIBLE POTATO STARCH GEL

A thermo-irreversible starch gel was made by the method described below.

First, a 22.5% (w/w) potato starch slurry was made by combining 55 lbs. of unmodified potato starch (approximately 80% dry solids ("d.s.") content; Avebe America Inc., Princeton, N.J.) and 190 lbs. 125° F. tap water in an agitation jacketed heating/cooling kettle. Sufficient continuous agitation was provided to keep starch in uniform suspension (slurry). The slurry was then heated under agitation to a temperature of 155° F. for about 5 seconds to achieve a 95%–100% gelation. This starch gel was then quickly chilled in kettle to about 100° F. and subsequently chilled in shallow tubs in a 28° F. to 30° F. cooler to a temperature of 35° F. to 45° F., and then held in 35° F. to 45° F. cooler ready for application. Prior to mixing into a meat blend, the chilled starch gel was ground through a meat grinder equipped with ⅛" plate and 4 blade knife.

EXAMPLE II

LOW-FAT SMOKED SAUSAGE INCLUDING POTATO STARCH GEL

The following ingredients were combined as described below to produce a low-fat smoked sausage in accordance with the present inventive compositions and methods.

| INGREDIENTS: | POUNDS |
| --- | --- |
| TURKEY | 53.0000 |
| WATER | 26.9300 |
| PORK | 46.5000 |
| PRE-GELLED STARCH (POTATO 18% d.s.) | 30.0000 |
| SALT | 4.1000 |
| HYDROLYZED MILK PROTEIN (MPH36) | 3.5000 |
| FLAVORING | 3.3394 |
| MUSTARD | 2.0000 |
| GARLIC POWDER | 0.0625 |
| OR CAPSICUM | 0.0084 |
| MUSTARD FLOUR | 0.0685 |
| BACON FL,MBC110C | 1.2000 |

-continued

| INGREDIENTS: | POUNDS |
| --- | --- |
| DEXTROSE | 3.0000 |
| CORN SYRUP SOLIDS | 3.0000 |
| DRY GELATIN 250 bloom | 0.7500 |
| BEEF | 0.5000 |
| SODIUM PHOSPHATE | 0.2500 |
| CHAR OIL LIQUID SMOKE | 0.1500 |
| ASCORBIC ACID | 0.0470 |
| SODIUM NITRITE | 0.0156 |
| TOTAL | 175.0820 |

The meats at about 32° F.–40° F. were ground to about ¼" and mixed with salt, ascorbic acid and sodium nitrite. After holding in a cooler at about 32° F. to 40° F. overnight, the meat blend was reground through ³⁄₁₆" plate. In a sausage blender, the re-ground meat blend was mixed with (in the following order) ½ of the prescribed water, sodium phosphate, hydrolyzed milk protein until well mixed (18 rpm, 3–5 minutes). Flavoring, dextrose, corn syrup, dry gelatin, liquid smoke and remainder of the water were then added to the blender for another 3 to 5 minutes at 18 rpm. Ground (⅛") pre-gelled starch was then added to the blender and mixed under vacuum for about 3–5 minutes. The mixed sausage blend was then discharged from blender and stuffed into sausage casing. The sausages were then cooked/smoked in an industrial smokehouse for approximately 2–2½ hours to reach an internal product temperature of 160° F. to 162° F. The smoked sausages were then showered with cold water for 15 minutes, chilled in a blast cooler for 45–60 minutes to an internal temperature of 35° F.–42° F. Finished products were peeled of casing, packaged and stored in cooler for serving/consumption.

EXAMPLE III

COMPARATIVE SENSORY ANALYSIS OF LOW-FAT SAUSAGE

A sensory analysis was performed to compare the flavor, texture and over-all acceptance of the low-fat sausage prepared as described in Example II with similarly prepared low-fat sausage using only dry potato starch ("CONTROL") as formulated below.

| INGREDIENTS: | CONTROL POUNDS |
| --- | --- |
| TURKEY | 53.0000 |
| WATER | 51.5300 |
| PORK | 46.5000 |
| STARCH (POTATO d.s.) | 5.4000 |
| PRE-GELLED STARCH (POTATO 18% d.s.) | — |
| SALT | 4.1000 |
| MPH36 | 3.5000 |
| FLAVORING | 3.3394 |
| MUSTARD | 2.0000 |
| GARLIC POWDER | 0.0625 |
| OR CAPSICUM | 0.0084 |
| MUSTARD FLOUR | 0.0685 |
| BACON FL,MBC110C | 1.2000 |
| DEXTROSE | 3.0000 |
| CORN SYRUP SOLIDS | 3.0000 |
| GELATIN 250 bloom | 0.7500 |
| BEEF | 0.5000 |
| SODIUM PHOSPHATE | 0.2500 |
| CHAR OIL LIQUID SMOKE | 0.1500 |
| ASCORBIC ACID | 0.0470 |

-continued

| INGREDIENTS: | CONTROL POUNDS |
| --- | --- |
| SODIUM NITRITE | 0.0156 |
| TOTAL | 175.0820 |

Proto-monadic testing methodology was used for the test, where respondents first rated one of the two products on its own, and then were given both products and asked their preferences. The sample includes 200 adult males and females, qualified as past three month users of rope smoked sausage.

On a monadic basis, the mean overall acceptance ratings for the experimental formulation was statistically significant at 83% confidence level. On a side-by-side basis, however, the experimental formulation was clearly preferred over the standard production: by a three-to-one margin.

| Overall Acceptance Rating | |
| --- | --- |
| Experimental Formula | 7.0 |
| Standard Product | 6.7 |
| Overall Preference | |
| Prefer Experimental | 65% |
| Prefer Standard | 22 |
| No Preference | 13 |

Results of this test clearly indicate that the experimental formulation is superior to standard production.

Although the invention has been described with reference to the presently-preferred embodiments, it should be understood that various modifications can be made without departing from the spirit of the invention.

I claim:

1. A low-fat meat analogue food product comprising a plant protein meat analogue and a thermo-irreversible starch gel, the starch gel having a texture that mimics the texture of adipose tissue.

2. The low-fat meat analogue of claim 1, wherein the plant protein comprises soy protein.

3. The low-fat meat analogue food product of claim 1, further comprising one or more food ingredients selected from the group consisting of vegetables, pastry, breading, gravy and seasonings.

4. The low-fat meat analogue food product of claim 1, wherein the thermo-irreversible starch gel comprises at least one pre-gelled starch selected from the group consisting of potato starch gel, tapioca starch gel, corn starch gel, wheat starch gel and rice starch gel.

5. The low-fat meat analogue food product of claim 4, wherein the thermo-irreversible starch gel is potato starch gel.

6. The low-fat meat analogue food product of claim 4, wherein the thermo-irreversible starch gel is tapioca starch gel.

7. The low-fat meat analogue food product of claim 1, wherein the amount of thermo-irreversible starch gel is in the range of about 5% to about 50% by weight of plant protein.

8. The low-fat meat analogue food product of claim 7, wherein the amount of thermo-irreversible starch gel is in the range of about 10% to about 40% by weight of the plant protein.

9. The low-fat meat analogue food product of claim 8, wherein the amount of thermo-irreversible starch gel is about 30% by weight of the plant protein.

10. The low-fat meat analogue food product of claim 1, wherein the plant protein is minced and the thermo-irreversible starch gel has an average particle size of about 0.1 to about 3 times the particle size of the minced plant protein.

11. The low-fat meat analogue food product of claim 1, wherein the fat content of the low-fat meat analogue is about 20 percent or less of the total weight of the low-fat meat analogue.

12. The low-fat meat analogue food product of claim 11, wherein the fat content of the low-fat meat analogue is about 10 percent or less of the total weight of the low-fat meat analogue food.

13. The low-fat meat analogue food product of claim 12, wherein the fat content of the low-fat meat analogue is about 5 percent or less of the total weight of the low-fat meat analogue.

14. A method of making a low-fat minced meat analogue comprising the steps of:
   (a) forming a thermo-irreversible starch gel from a gelling agent comprising potato starch;
   (b) grinding the thermo-irreversible starch gel to an average particle size of about one-eighth of an inch; and
   (c) mixing the ground thermo-irreversible starch gel with ground plant protein, wherein the amount of thermo-irreversible starch gel is about 30% by weight of the plant protein.

15. A low-fat ground meat analogue food product comprising ground meat and a thermo-irreversible gel consisting essentially of a gelled starch.

16. The low-fat meat analogue food product in accordance with claim 15, wherein the starch is selected from the group consisting of potato starch and tapioca starch.

17. The low-fat meat analogue food product of claim 16 wherein the fat content of the low-fat meat analogue food product is about 20 percent or less of the total weight of the low-fat meat analogue food.

18. The low-fat meat analogue food product of claim 17, wherein the thermo-irreversible gel has an average particle size of about 0.1 to about 3 times the particle size of the ground meat.

19. The low-fat meat analogue food product of claim 16 wherein the fat content of the low-fat meat analogue food product is about 10 percent or less of the total weight of the low-fat meat analogue food.

20. A low-fat meat analogue food product consisting essentially of a plant protein meat analogue and a thermo-irreversible gel-adipose tissue mimetic, the thermo-irreversible gel comprising a gelled starch.

* * * * *